Jan. 11, 1938.  C. R. RICHTER  2,104,761
WELDING AND CUTTING TORCH
Filed April 8, 1936  2 Sheets-Sheet 2
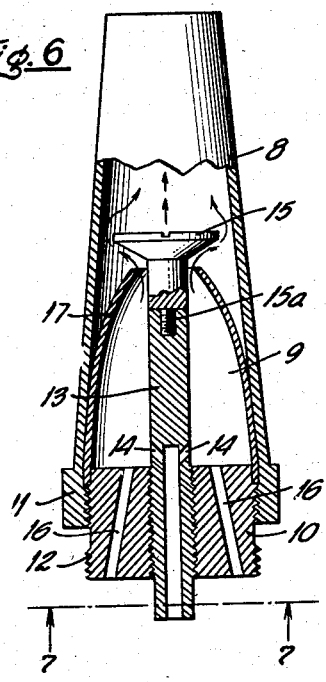
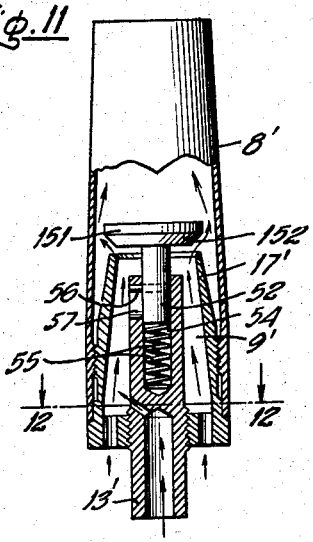
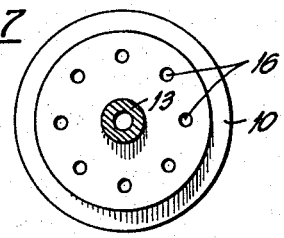
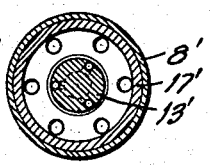
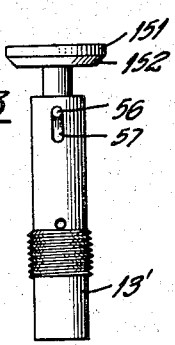
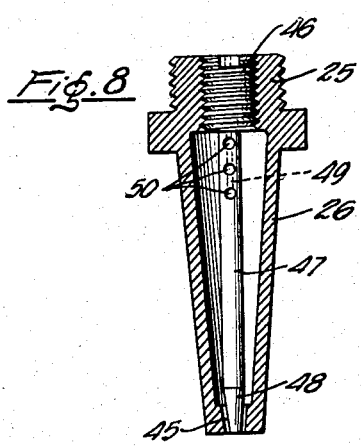
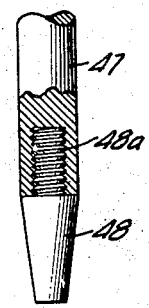
Inventor:
Carl R. Richter,
by Saml L. Wood
His Attorney.

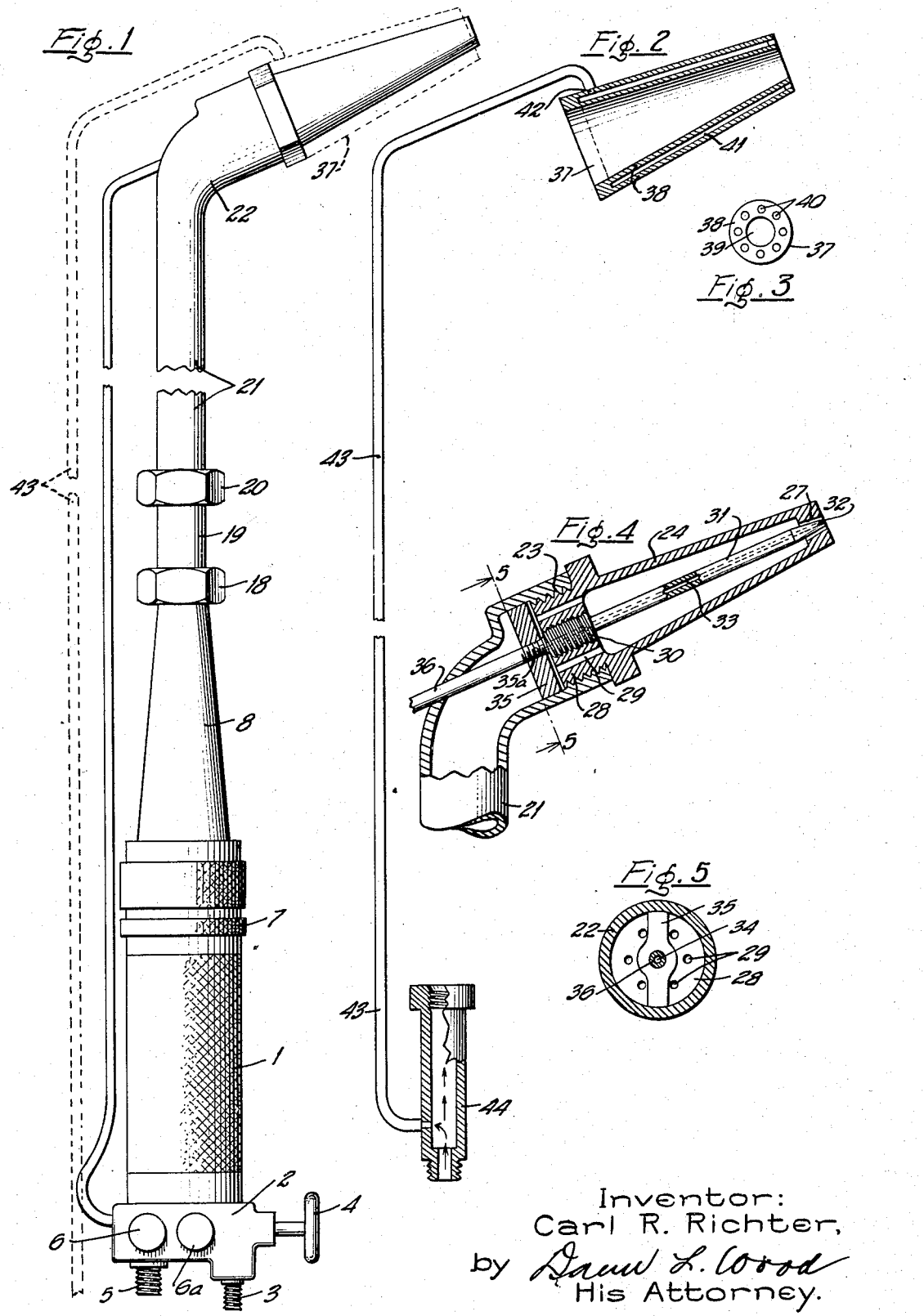

Patented Jan. 11, 1938

2,104,761

UNITED STATES PATENT OFFICE 2,104,761

WELDING AND CUTTING TORCH

Carl R. Richter, Schenectady, N. Y.

Application April 8, 1936, Serial No. 73,291

5 Claims. (Cl. 158—27.4)

My invention relates to a welding and cutting torch and has for its primary object the provision of a torch which is adaptable and may be readily used for both high and low pressure welding and for cutting, only slight adjustments and changes being necessary on the torch to render it quickly adaptable for any of these three purposes.

One important object of my invention lies in the provision of a welding tip which is suitable for both high and low pressure welding and which is provided with an adjustment which renders it readily adaptable for many different types and classes of welding operations, thereby eliminating the necessity of substituting tips for different operations.

Another object of my invention lies in the provision of an attachment for the torch and welding tip whereby steel welding can be accomplished with the torch without oxidation of the metal.

Still another object of my invention lies in the provision of an improved mixing chamber for the fuel gases before delivery to the tip.

A further object lies in the provision of an improved adjustable welding tip.

Still another object of my invention lies in the provision of an improved adjustable cutting tip.

Other objects and advantages in details of construction and arrangement of parts will be apparent as the description proceeds, reference now being had to the figures of the accompanying drawings, forming a part of this application and wherein like reference numerals indicate like parts.

My present application is a continuation in part of my application Ser. No. 756,131 which was filed in the Patent Office December 5, 1934.

In the drawings:

Figure 1 is a side view of my improved torch.

Figure 2 is a side view, partially in section, illustrating the attachment for steel welding.

Figure 3 is a detail view of the end of the tip attachment.

Figure 4 is a detail sectional view illustrating the cutting tip.

Figure 5 is a sectional view taken on the line 5—5 of Figure 4.

Figure 6 is a sectional view illustrating the mixing chamber.

Figure 7 is a sectional end view of the mixing chamber taken on the line 7—7 of Figure 6.

Figure 8 is a detail sectional view of the welding tip.

Figure 9 is an end view of the welding tip.

Figure 10 is a detail view, partly broken, showing the adjustable end of the needle valve.

Figure 11 is a side view, partially in section, similar to Fig. 6 and illustrating the parts forming a mixing chamber equipped with an automatically operated antiexplosion device.

Figure 12 is a section taken along the line 12—12 of Fig. 11, and

Figure 13 is a side view of the central oxygen carrying tube equipped with the antiexplosion device.

Like reference characters indicate like parts throughout the drawings.

It should be stated here that my improved torch and the welding and cutting tips have been designed primarily in order to utilize city gas or other gas of low B. t. u. properties. In both the mixing chamber and the tips, care has been taken to provide for a maximum mixing of the gas and oxygen, whether delivered under high or low pressure, in order to provide a more perfect and more rapid combustion of the gases at the tip end. Heretofore in attempts to use city gas or the like for welding or cutting it has been found that with the ordinary equipment, designed for high B. t. u. gases, there was not adequate mixing provided for with the result that the use of the economical low B. t. u. gas for welding and cutting purposes has not become commercially successful. By my invention in providing the torch and tips of improved design, I have made possible the use of low B. t. u. gases such as ordinary city gas for welding, preheating and cutting purposes. This obviously makes possible a great economy to welders as the city gas in most communities is piped to nearly every shop and dwelling where it is readily and economically available and eliminates the necessity of the expensive handling and use of tanks of compressed acetylene or other high B. t. u. gases.

The reference character 1 refers to the handle of my improved torch provided at its lower end with a valve casing 2 provided with a gas inlet 3 controlled by a valve member 4. Also provided in the valve casing 2 is an oxygen inlet 5 controlled by a valve member 6. A third control valve 6a is provided for a purpose to be described. At a point directly adjacent the handle 1 and suitably secured thereto as by the threaded sleeve 7 is a substantially conical shaped casing 8 enclosing the mixing chamber 9 (see Figure 6). It will be understood that within the handle 1 are communicating passages leading from the gas inlet valve 4 and the oxygen inlet valve 6 upwardly through the handle to the mixing chamber.

These passages have not been shown in detail as they form no part of this invention and comprise ordinary standard and well known means.

The open lower end of the mixing chamber 9 is provided with a plug 10 threadably or otherwise secured, as shown clearly in Figure 6, to the threaded boss 11 provided on the lower end of the casing 8. This plug is also provided at its lower end with threads 12 adapted to receive the threaded connecting sleeve 7 whereby the same may be attached to the handle 1. Extending upwardly through a suitable opening in the plug 10 is a tube 13 open at its lower end and communicating with the oxygen supply passage through the handle 1 whereby the oxygen passes upwardly through this tube 13. The tube is provided intermediate its ends with outlet ports or openings 14 through which the oxygen escapes into the mixing chamber 9. The upper end of the tube 13 is closed as shown in Figure 6 and is provided with a detachable and adjustable spreader 15 preferably threaded into the recessed end of the tube 13 as at 15a for a purpose to be described.

The plug 10 is also provided with a plurality of diagonally disposed openings 16 communicating at their lower ends with the gas supply passage in the handle 1 and at their opposite ends opening into the mixing chamber 9. These openings 16 are so disposed as to be directed in an intersecting direction with the openings 14 in the oxygen tube 13 whereby the gas passing through the openings 16 is directed into the oxygen as it passes outwardly through the openings 14 into the mixing chamber. This results in immediate and relatively violent agitation and mixing of the gas and oxygen within the mixing chamber 9.

Secured within the mixing chamber 9 is a baffle 17 secured at its lower end between the boss 11 and the plug 10 and curving inwardly toward its upper open end as shown clearly in Figure 6. The open upper end of the baffle 17 terminates just beneath the spreader 15 on the end of the tube 13 and the mixed oxygen and gas passes out of the mixing chamber 9 through the constricted upper open end of the baffle and immediately contacts the underside of the adjustable spreader 15 around which it passes upwardly through the casing 8. The spreader 15 serves as an additional means for disturbing the free flow of the mixed gases resulting in additional agitation of them and a consequent more complete mixing thereof. It serves also as a safety stop against backfires.

The upper open end of the casing 8 is suitably secured as by a threaded sleeve 18 (see Figure 1) to a pipe section 19 which in turn is secured as by the threaded sleeve 20 to the torch pipe 21. The section 19 may be omitted and the torch pipe 21 secured directly to the casing 8 if desired. Likewise the section 19 may be of any desired length depending upon the length of torch required for a particular welding or cutting job. Obviously this section 19 comprises an extension member and is readily removable to permit substitution of extension sections of any desired length.

The end of the torch pipe 21 is bent angularly as at 22 and is internally threaded to receive the threaded end 23 of a cutting tip 24 (see Figure 4) or the threaded end 25 of a welding tip 26 (see Figure 8).

The cutting tip 24 comprises a hollow, substantially conical shaped casing, the free end of which is provided with a substantially conical shaped opening 27. The opposite end of the tip is provided with a plug 28 preferably integral with the tip casing through which is provided a plurality of openings or passages 29 communicating with the interior of the tip casing 24 and with the torch pipe 21 whereby the mixed oxygen and gas from the mixing chamber passes through the openings 29 into the tip casing 24 and out through the opening 27 at the free end thereof. The plug 28 is provided centrally with a threaded opening adapted to receive the threaded enlargement 30 of a hollow needle valve 31 extending through the tip casing 24 and provided at its free end with a substantially conical shape member 32 lying within the opening 27 and thus restricting said outlet opening 27 to an annular opening around the end 32 of the needle valve whereby the mixed gases pass to the atmosphere through such circular opening. The needle valve being adjustable within the tip casing 24 by virtue of the threaded connection 30 with the plug 28, it will be obvious that the size of the discharge opening 27 may be regulated to any desired degree depending upon the type of cutting operation to be performed.

In order that the tip may improve the flame temperature and also increase or decrease the size of flame, I have provided the adjustable needle valve 31 in the form of a hollow tube, the opening 33 therethrough opening to the atmosphere at its free end and within the opening 27 of the tip and communicating at its opposite end through the reduced threaded portion 30a with a passage 34 provided in a spider or bar 35 suitably secured within the end of the torch pipe 21 immediately adjacent the tip. Communicating with this passage 34 and the needle valve opening 33 is an oxygen supply pipe 36 extending alongside or inside the torch pipe and handle and having suitable connection 35a with the bar 35 in alignment with the passage 33 and at its opposite end with the oxygen supply within the handle, and controlled by the valve 6a. Any suitable valve arrangement may be provided in the valve casing 2 whereby the valve member 6a may be operated to open or close the pipe 36 in addition to the ordinary oxygen supply within the handle. If the additional oxygen is necessary for the particular cutting job being undertaken, the operator merely opens the additional oxygen passage through the pipe 36, by operating valve 6a, resulting in the discharge of oxygen through the needle valve 31, to the flame at the end of the tip.

In order that the torch may be also used as a welding torch with a minimum amount of adjustment and change, I have provided for the substitution of a special welding tip for the cutting tip. This welding tip is shown in Figure 8 and comprises the casing 26 provided with the threaded end 25 by means of which it may be secured to the end of the torch pipe 21 in place of the cutting tip just described.

The free end of the welding tip is provided with a substantially conical shaped opening 45. Suitably mounted within the end 25 of the tip is the threaded end 46 of an adjustable needle valve 47, the free end of which is substantially conically shaped as at 48 for engagement within the discharge opening 45. The needle valve 47 is provided with a passage 49 for a portion of its length only and communicating with this passage 49 is a plurality of openings 50 opening into the hollow chamber 51 of the tip. The opposite end of the passage 49 is adapted to communicate with the end of the torch pipe 21 through which the mixed gas and oxygen pass whereby such gases will pass into the tip through the needle valve passage 49 and out into the tip chamber 51 through the openings 50 and thence through the opening 45 to the flame. The passage 49 in the needle valve communicates only with the mixed gas passage in the torch pipe and not with the extra oxygen pipe 36 shown in Figure 4. The end of the needle valve is not connected with the passage 34 in the spider 35 but lies directly ahead of such spider and free of it. The spider 35 in this case serves as an additional deflector for the mixed gases and consequently increases the completeness of the mixing.

As so far described the torch and welding tip are adaptable for high pressure welding, the mixing of the oxygen and gas being so complete due to the design of the mixing chamber and tip, that a low B. t. u. gas such as city gas may be employed and when ignited at the discharge end of the tip, will burn with sufficient intensity to provide a satisfactory weld. The adjustability of the needle valve in the tip eliminates the necessity for changing tips when different sizes of flames are desired.

The same welding tip 26 as so far described is equally adaptable for use with low pressure welding, by simply removing the needle valve 47 from the tip casing, and adjusting the spreader 15 in the mixing chamber 8 away from the baffle 17 (see Figure 6).

It should be stated here also that by causing the mixed oxygen and gas from the mixing chamber to pass into the tip casing 26 through the restricted openings 50, serves as an additional means of more completely and thoroughly mixing of such gases before they reach the flame end of the tip. This is another contributing factor to the successful and practical use of this tip and torch with gases of low B. t. u. properties.

In Figures 9 and 10 I have shown a further adjustment for the tip. The cone shaped end 48 of the needle valve is threadably secured to the valve stem 47 as at 48a whereby the cone end may be adjusted independently of the threaded end 46. This is convenient for quick adjustments. This same arrangement may also be provided on the cutting tip and the cone end 32 thereof if desired.

It has been found that in the welding of steel with low B. t. u. gases, when the molten metal is exposed at the point of welding to atmospheric conditions, the molten metal oxidizes thus preventing a clean weld. In order to prevent this oxidation I have provided an attachment for the torch and tip which may be readily attached or detached as required, or provided as a permanent part of the torch. This attachment is shown clearly in Figure 2 and comprises a substantially conical shaped shell 37 adapted to fit over the tip casing 26. The shell is provided with a double wall 38 providing an enclosed space completely surrounding the tip casing. The free end of the shell is provided with an opening 39 of the same size and diameter as the end of the welding tip 26 whereby the gases from the tip may pass freely therethrough to the flame. The free end of the shell 37 is also provided with a plurality of small openings 40 surrounding the large central opening 39. This chamber 41 is closed at its opposite end as shown clearly in Figure 2. Also communicating with this chamber 41 through the opening 42 adjacent the rear end of the shell is a pipe 43 adapted to extend outside of the torch to the handle thereof where it may be attached to and in communication with the gas supply line by means of a threaded attaching means 44. This connection with the gas supply line may be at the point 3 on the handle or in any other suitable manner and of course, is controlled either by the valve member 4 or by other suitable controlling means. The admission of the gas through the pipe 43 and its passage out through the openings 40 in the shell 37 around the outlet 27 of the tip, results in providing an enclosing ring of gas unmixed with oxygen, around the flame at the point of welding. This ring of gas serves as a protecting film or curtain against the atmosphere coming in contact with the molten metal at the point of welding and thus prevents the oxidation of such metal. The burning gas ring entirely surrounding the welding flame shields it from the atmosphere and the resultant oxidizing effect thereof on the molten metal.

As before stated this attachment may be readily removed from the torch when other than steel welding is being done and may be quickly attached for the purpose just described.

In the embodiment of my invention illustrated in Figs. 11, 12 and 13 I have shown a modification of my invention in which means are provided for automatically preventing an explosion from taking place in the handle of the torch, in the hose leading thereto or in the control devices which are associated therewith. In the form of the invention here shown, the spreader 151 is mounted on a stem 52 which is received in an opening 54 in the upper end of the member 13' and which is urged outwardly as viewed in Fig. 11 by a coil spring 55. The spreader is, however, in the form here shown, provided with a conical valve portion 152 which when the spreader is depressed engages a conical seat formed on the upper edge of the baffle 17', thereby closing the passage between the spreader and the upper edge of the said baffle. The stem is preferably provided with an outwardly extending pin 56 which is received in a slot 57 in the wall surrounding the opening 54. The pin thus constitutes a stop for the movement of the spreader 151 and the stem on which it is mounted. When the spreader is moved outwardly to its limit as shown in Fig. 11, the spreader is spaced from the upper edge of the casing 8' of the mixing chamber in about the same way as is the spreader in Fig. 6.

Now in case of an explosion in front of the baffle 17' the pressure exerted thereby against the upper face of the spreader 151 forces the same inwardly against the action of the spring 55 thereby seating the valve portion 152 of the spreader against the valve seat at the upper edge of the baffle 17' and closing the passage and preventing the explosion from being communicated to the gases beneath the spreader in the chamber 9' in the baffle and into the handle of the torch, the hose and the regulating and control instruments communicating therewith.

Thus far, it will be clear that I have provided a torch with tips and attachment for welding, cutting and preheating purposes which is practically universal in its application, being usable for either high or low pressure welding and with either gases of high or low B. t. u. properties.

It will thus be seen that I have provided a universal torch adaptable for both high and low pressure welding with gases of either high or low B. t. u. properties, and for cutting. In addition I have provided means for preventing the oxidation of the molten metal in welding operations.

It will be understood, of course, that changes may be made by way of detail without departing from the spirit and scope of my invention. I do not limit myself, therefore, to the exact form herein shown and described other than by the appended claims.

What I claim is:

1. A welding and cutting torch comprising a tip, a handle and inlets for gas and oxygen, a mixing chamber between said handle and tip, an oxygen supply tube longitudinally disposed in said chamber having lateral outlet openings, a plurality of gas supply openings communicating with said chamber and disposed in an intersecting direction with said outlet openings, and a baffle in said chamber restricting the outlet passage thereof, said baffle comprising a substantially conical shaped casing surrounding said tube and having an opening at its small end through which said tube extends and through which the mixed gases pass, and a spreader on the extending end of said tube, said spreader overlying the open end of said baffle.

2. A welding and cutting torch comprising a tip, a handle and inlets for gas and oxygen, a mixing chamber between said handle and tip, an oxygen supply tube longitudinally disposed in said chamber having lateral outlet openings, a plurality of gas supply openings communicating with said chamber and disposed in an intersecting direction with said outlet openings, and a baffle in said chamber restricting the outlet passage thereof, said baffle comprising a substantially conical shaped casing surrounding said tube and having an opening at its small end through which said tube extends and through which the mixed gases pass, and a spreader on the extending end of said tube, said spreader overlying the open end of said baffle, said spreader being adjustable with respect to said baffle.

3. A welding and cutting torch comprising a tip, a handle and inlets for gas and oxygen, a mixing chamber between said handle and tip, an oxygen supply tube longitudinally disposed in said chamber having lateral outlet openings, a plurality of gas supply openings communicating with said chamber and disposed in an intersecting direction with said outlet openings, and a baffle in said chamber restricting the outlet passage thereof, said baffle comprising a substantially conical shaped casing surrounding said tube and having an opening at its small end through which said tube extends and through which the mixed gases pass, and a spreader on the extending end of said tube, said spreader overlying the open end of said baffle, said mixing chamber being substantially conical in shape, the discharge end thereof being the restricted portion.

4. In a torch of the character described, a casing forming a gas passage, a tip, means defining a mixing chamber and comprising a baffle generally conical in form to which oxygen and gas are introduced and which tapers forwardly in the direction of the flow of gases, and a spreader disposed at the forward end of said baffle, yielding means for normally forcing said spreader into spaced relation to the forward end of said baffle and movable rearwardly into engagement with the forward end of said baffle in response to pressure developed in advance of said spreader.

5. In a torch of the character described, a tip, a handle and inlets for gas and oxygen, respectively, means defining a mixing chamber disposed between said handle and said tip, an oxygen supply tube longitudinally disposed in said chamber and having lateral outlet openings, a plurality of gas supply openings communicating with said chamber and disposed in an intersecting direction with said outlet openings, and a baffle in said chamber restricting the outlet passage thereof, said baffle comprising a substantially conical shaped casing surrounding said tube and having an opening at its small end through which said tube extends and through which the mixed gases pass, and an inwardly movable spreader on the extending end of said tube and overlying the open end of said baffle.

CARL R. RICHTER.